United States Patent
Lim et al.

(10) Patent No.: US 10,062,313 B2
(45) Date of Patent: Aug. 28, 2018

(54) DATA DRIVER INCLUDING NOISE SHIELDING LINES AND DISPLAY APPARATUS HAVING THE SAME

(71) Applicant: Samsung Display Co., LTD., Yongin, Gyeonggi-Do (KR)

(72) Inventors: Kyu-Hun Lim, Cheonan-si (KR); Dae-Seop Kim, Suwon-si (KR); Ki-Deog Song, Seoul (KR); Jae-Jin Choi, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 259 days.

(21) Appl. No.: 14/548,584

(22) Filed: Nov. 20, 2014

(65) Prior Publication Data
US 2015/0279263 A1 Oct. 1, 2015

(30) Foreign Application Priority Data
Mar. 27, 2014 (KR) .................. 10-2014-0036219

(51) Int. Cl.
*G09G 3/20* (2006.01)
*G02F 1/1345* (2006.01)
(Continued)

(52) U.S. Cl.
CPC ......... *G09G 3/2092* (2013.01); *G02F 1/1345* (2013.01); *G09G 3/3225* (2013.01);
(Continued)

(58) Field of Classification Search
CPC .. G09G 3/3688; G09G 3/3685; G09G 3/0412; G09G 3/3696; G09G 3/3666; G09G 3/038; G09G 2300/0426; G09G 2370/08; G09G 2330/06; G09G 2330/12; G09G 2310/027; G09G 2310/0281; G09G 2320/0223; G02F 1/13452; G02F 1/1345; G02F 1/13454; G02F 1/1362;
(Continued)

(56) References Cited

U.S. PATENT DOCUMENTS 5,598,283 A * 1/1997 Fujii ..................... G02F 1/1345
349/143
6,262,702 B1 * 7/2001 Murade ................ G02F 1/1345
345/100
(Continued)

FOREIGN PATENT DOCUMENTS

JP 2012-190036 10/2012
KR 10-2000-0061167 10/2000
(Continued)

*Primary Examiner* — Nalini Mummalaneni
(74) *Attorney, Agent, or Firm* — Innovation Counsel LLP

(57) ABSTRACT

A data driver includes a data driving chip, a first data transmitting line, a second data transmitting line, a first shielding line and a second shielding line. The first data transmitting line and the second data transmitting line are configured to transmit a data signal to the data driving chip. The first shielding line is disposed at a first side with respect to the first data transmitting line. A ground voltage is applied to the first shielding line. The second shielding line is disposed at a second side with respect to the second transmitting line. The second side is opposite to the first side. The ground voltage is applied to the second shielding line.

16 Claims, 10 Drawing Sheets

(51) Int. Cl.
　　　*G09G 3/3225*　　　(2016.01)
　　　*G09G 3/36*　　　(2006.01)
(52) U.S. Cl.
　　　CPC ..... *G09G 3/3648* (2013.01); *G09G 2300/043* (2013.01); *G09G 2320/0276* (2013.01); *G09G 2330/06* (2013.01); *G09G 2370/08* (2013.01); *G09G 2370/14* (2013.01)
(58) Field of Classification Search
　　　CPC ........ G02F 2001/133334; G02F 2001/133388; G02F 2001/40; H05K 9/0037; H05K 9/0054; G06F 1/1601; G06F 2203/04107
　　　See application file for complete search history.

(56) References Cited

U.S. PATENT DOCUMENTS

| | | | |
|---|---|---|---|
| 6,867,490 B2 * | 3/2005 | Toyosawa | H01L 21/563 257/692 |
| 7,102,196 B2 | 9/2006 | Lee | |
| 7,606,046 B2 | 10/2009 | Han et al. | |
| 7,750,876 B2 | 7/2010 | Murade | |
| 7,965,367 B2 * | 6/2011 | Oohira | H05K 1/0219 349/149 |
| 2004/0108985 A1 * | 6/2004 | Song | G02F 1/1345 345/87 |
| 2005/0018409 A1 * | 1/2005 | Hirakata | H05K 1/028 361/752 |
| 2005/0083474 A1 * | 4/2005 | Park | G02F 1/13452 349/151 |
| 2008/0062373 A1 * | 3/2008 | Kim | G02F 1/1345 349/151 |
| 2008/0062666 A1 * | 3/2008 | Lim | G02F 1/13452 361/777 |
| 2009/0244035 A1 * | 10/2009 | Cho | G02F 1/13452 345/204 |
| 2010/0110359 A1 * | 5/2010 | Lee | G02F 1/1345 349/149 |

FOREIGN PATENT DOCUMENTS

| | | |
|---|---|---|
| KR | 10-1089979 | 12/2011 |
| KR | 10-1174630 | 8/2012 |

* cited by examiner

DATA DRIVER INCLUDING NOISE SHIELDING LINES AND DISPLAY APPARATUS HAVING THE SAME

PRIORITY STATEMENT

This application claims priority under 35 U.S.C. § 119 to Korean Patent Application No. 10-2014-0036219, filed on Mar. 27, 2014 in the Korean Intellectual Property Office KIPO, the contents of which are herein incorporated by reference in their entireties.

BACKGROUND

1. Field of Related Art

Exemplary embodiments of the present system and method relate to a data driver for a display apparatus having a display panel. More particularly, exemplary embodiments of the present system and method relate to a data driver that improves the reliability of a display apparatus having a display panel.

2. Description of Related Art

Generally, a display apparatus includes a display panel and a panel driver. The display panel includes a plurality of gate lines and a plurality of data lines. The panel driver includes a gate driver that provides gate signals to the gate lines, a data driver that provides data voltages to the data lines, and a timing controller that controls the timings of the gate driver and the data driver for driving their respective signals.

Because the data driver generally drives data signals at a high frequency, the data signals being driven may be distorted by noise. Signal distortion due to noise decreases the reliability of the data driver and may cause the display panel to display an abnormal image.

SUMMARY OF THE SYSTEM AND METHOD

Exemplary embodiments of the present system and method provide a data driver that improves the reliability and display quality of a display panel.

Exemplary embodiments of the present system and method also provide a display apparatus having the data driver.

In an exemplary embodiment of a data driver according to the present system and method, the data driver includes a data driving chip, a first data transmitting line, a second data transmitting line, a first shielding line and a second shielding line. The first data transmitting line and the second data transmitting line are configured to transmit a data signal to the data driving chip. The first shielding line is disposed at a first side with respect to the first data transmitting line. A ground voltage is applied to the first shielding line. The second shielding line is disposed at a second side with respect to the second transmitting line. The second side is opposite to the first side. The ground voltage is applied to the second shielding line.

In an exemplary embodiment, resistances of the first shielding line and the second shielding line may be less than resistances of the first data transmitting line and the second data transmitting line.

In an exemplary embodiment, a distance between the first shielding line and the first data transmitting line may be equal to or less than a distance between the first data transmitting line and the second data transmitting line. A distance between the second shielding line and the second data transmitting line may be equal to or less than the distance between the first data transmitting line and the second data transmitting line.

In an exemplary embodiment, the first shielding line may include a first bent portion that bends toward the first data transmitting line. The second shielding line may include a second bent portion that bends toward the second transmitting line.

In an exemplary embodiment, the first shielding line may be connected to a first low-voltage terminal of a data driving chip. The second shielding line may be connected to a second low-voltage terminal of the data driving chip.

In an exemplary embodiment, the data driver may further include a connecting portion that connects the first shielding line and the second shielding line.

In an exemplary embodiment, a resistance of the connecting portion may be equal to or greater than a resistance of the first shielding line.

In an exemplary embodiment, a width of the connecting portion may be less than a width of the first shielding line.

In an exemplary embodiment, the connecting portion may include a convex and concave pattern.

In an exemplary embodiment, the data driver may further include a third shielding line disposed between the first data transmitting line and the second data transmitting line. The ground voltage may be applied to the third shielding line.

In an exemplary embodiment, the first shielding line may be connected to a first low-voltage terminal of the data driving chip. The second shielding line may be connected to a second low-voltage terminal of the data driving chip. The third shielding line may be connected to both the first low-voltage terminal and the second low-voltage terminal of the data driving chip.

In an exemplary embodiment, the data driver may further include a connecting portion that connects the first shielding line, the second shielding line and the third shielding line.

In an exemplary embodiment, the data driver may further include a first voltage transmitting line disposed at the first side of the first shielding line and a second voltage transmitting line disposed at the second side of the second shielding line.

In an exemplary embodiment, the data driving chip, the first shielding line and the second shielding line may be disposed on a substrate of the display panel.

In an exemplary embodiment, the data driver may further include a flexible printed circuit board on which the data driving chip is mounted. The first shielding line and the second shielding line may be disposed on the flexible printed circuit board.

In an exemplary embodiment of a display apparatus according to the present system and method, the display apparatus includes a display panel, a gate driver and a data driver. The display panel is configured to display an image. The gate driver is configured to apply a gate signal to the display panel. The data driver is configured to apply a data voltage to the display panel. The data driver includes a data driving chip, a first data transmitting line, a second data transmitting line, a first shielding line and a second shielding line. The first data transmitting line and the second data transmitting line are configured to transmit a data signal to the data driving chip. The first shielding line is disposed at a first side with respect to the first data transmitting line. A ground voltage is applied to the first shielding line. The second shielding line is disposed at a second side with respect to the second transmitting line. The second side is opposite to the first side. The ground voltage is applied to the second shielding line.

In an exemplary embodiment, resistances of the first shielding line and the second shielding line may be less than resistances of the first data transmitting line and the second data transmitting line.

In an exemplary embodiment, a distance between the first shielding line and the first data transmitting line may be equal to or less than a distance between the first data transmitting line and the second data transmitting line. A distance between the second shielding line and the second data transmitting line may be equal to or less than the distance between the first data transmitting line and the second data transmitting line.

In an exemplary embodiment, the first shielding line may include a first bent portion that bends toward the first data transmitting line. The second shielding line may include a second bent portion that bends toward the second transmitting line.

In an exemplary embodiment, the data driver may further include a connecting portion that connects the first shielding line and the second shielding line.

According to an embodiment of the present system and method, a data driver includes a shielding line that is disposed adjacent to a data transmitting line such that noise in a data signal may be prevented or otherwise reduced, thereby improving the reliability of the data driver and the display quality of a display panel using the data driver.

BRIEF DESCRIPTION OF THE DRAWINGS

The above and other features and advantages of the present system and method are described as exemplary embodiments below with reference to the accompanying drawings, in which.

DETAILED DESCRIPTION

Hereinafter, the present system and method are explained in detail with reference to the accompanying drawings.

Figure 1:
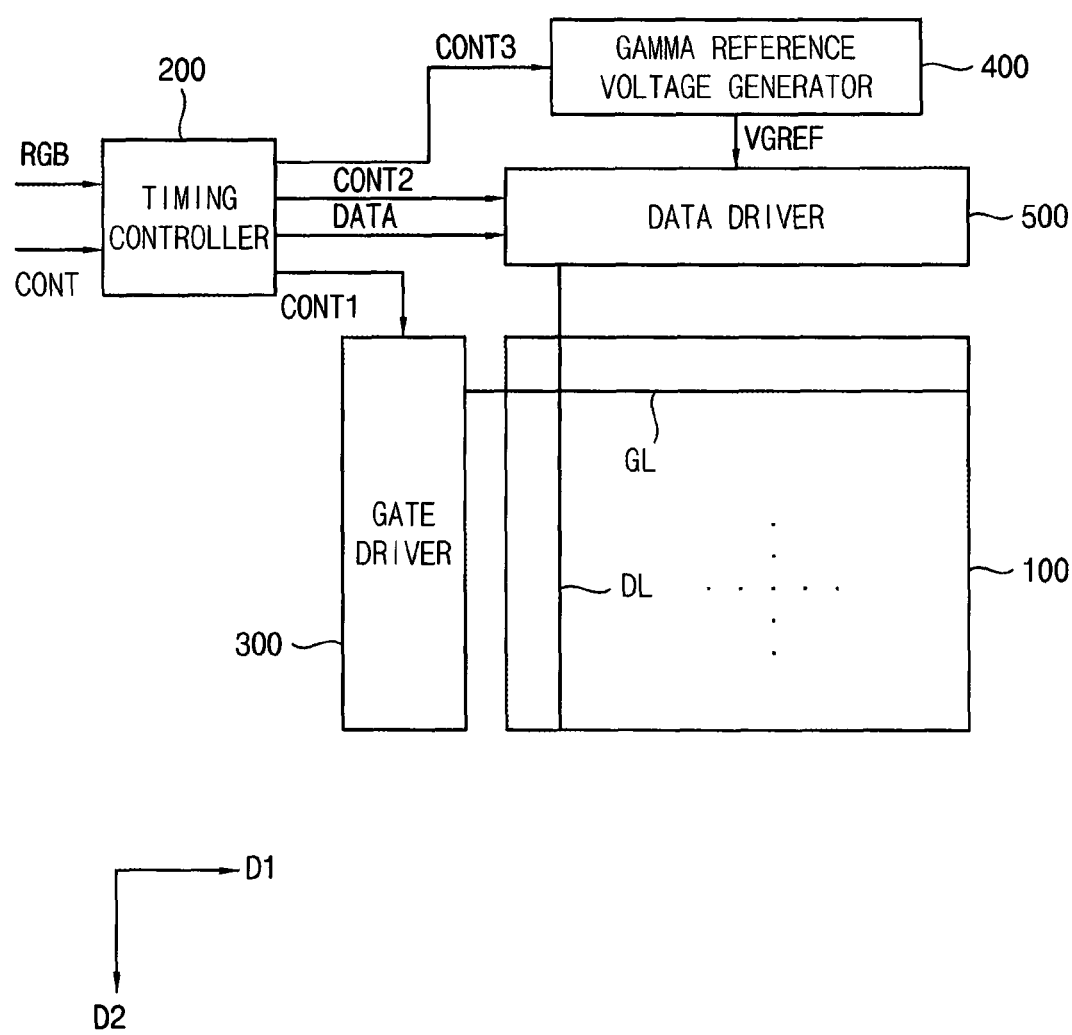
FIG. 1 is a block diagram illustrating a display apparatus according to an exemplary embodiment of the present system and method.

FIG. 1 is a block diagram illustrating a display apparatus according to an exemplary embodiment of the present system and method. The display apparatus includes a display panel 100 and a panel driver. The panel driver includes a timing controller 200, a gate driver 300, a gamma reference voltage generator 400 and a data driver 500.

The display panel 100 has a display region on which an image is displayed and a peripheral region adjacent to the display region. The display panel 100 includes a plurality of gate lines GL, a plurality of data lines DL and a plurality of pixels connected to the gate lines GL and the data lines DL. The gate lines GL extend in a first direction D1 and the data lines DL extend in a second direction D2 that intersects the first direction D1. The display panel 100 may be a liquid crystal display ("LCD") panel, but the present system and method is not limited thereto. Alternatively, the display panel 100 may be one of an organic light emitting diode ("OLED") display panel, a plasma display panel ("PDP") and a light emitting diode ("LED") display panel.

Each pixel includes a switching element (not shown), a liquid crystal capacitor (not shown) and a storage capacitor (not shown). The liquid crystal capacitor and the storage capacitor are electrically connected to the switching element. The pixels may be disposed in a matrix form.

The timing controller 200 receives input image data RGB and an input control signal CONT from an external apparatus (not shown). The input image data may include red image data R, green image data G and blue image data B. The input control signal CONT may include a master clock signal and a data enable signal. The input control signal CONT may further include a vertical synchronizing signal and a horizontal synchronizing signal.

The timing controller 200 generates a first control signal CONT1, a second control signal CONT2, a third control signal CONT3 based on the input control signal CONT, and a data signal DATA based on the input image data RGB. The first control signal CONT1 controls an operation of the gate driver 300 and is outputted to the gate driver 300. The first control signal CONT1 may include a vertical start signal and a gate clock signal. The second control signal CONT2 controls an operation of the data driver 500 and is outputted to the data driver 500. The second control signal CONT2 may include a horizontal start signal and a load signal. The third control signal CONT3 controls an operation of the gamma reference voltage generator 400 and is outputted to the gamma reference voltage generator 400. The data signal DATA is outputted to the data driver 500.

The gate driver 300 generates gate signals for driving the gate lines GL in response to the first control signal CONT1 received from the timing controller 200. The gate driver 300 sequentially outputs the gate signals to the gate lines GL. The gate driver 300 may be directly mounted on the display panel 100, connected to the display panel 100 as a tape carrier package (TCP) type, or integrated on the display panel 100.

The gamma reference voltage generator 400 generates a gamma reference voltage VGREF in response to the third control signal CONT3 received from the timing controller 200. The gamma reference voltage generator 400 provides the gamma reference voltage VGREF to the data driver 500. The gamma reference voltage VGREF has a value that corresponds to a level of the data signal DATA. In an exemplary embodiment, the gamma reference voltage generator 400 may be disposed in the timing controller 200, or in the data driver 500.

The data driver 500 receives the second control signal CONT2 and the data signal DATA from the timing controller 200, and receives the gamma reference voltages VGREF from the gamma reference voltage generator 400. The data driver 500 converts the data signal DATA into analog data voltages using the gamma reference voltages VGREF. The data driver 500 sequentially outputs the data voltages to the data lines DL. The data driver 500 may be directly mounted on the display panel 100, connected to the display panel 100 as a TCP type, or integrated on the display panel 100.

Figure 2:
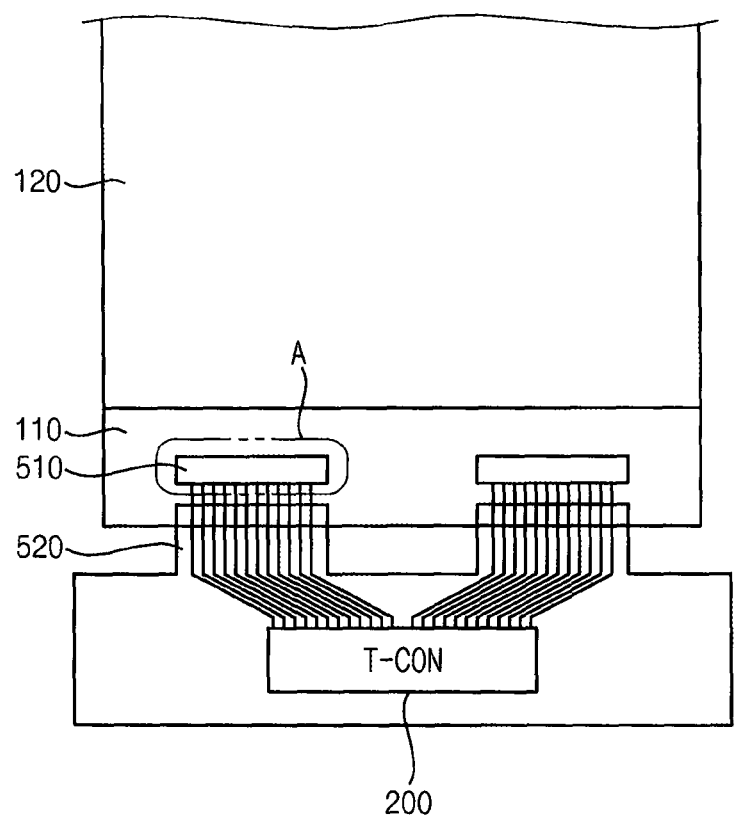
FIG. 2 is a plan view illustrating a display panel, a timing controller and a data driver of FIG. 1 according to an exemplary embodiment of the present system and method.
Figure 3:
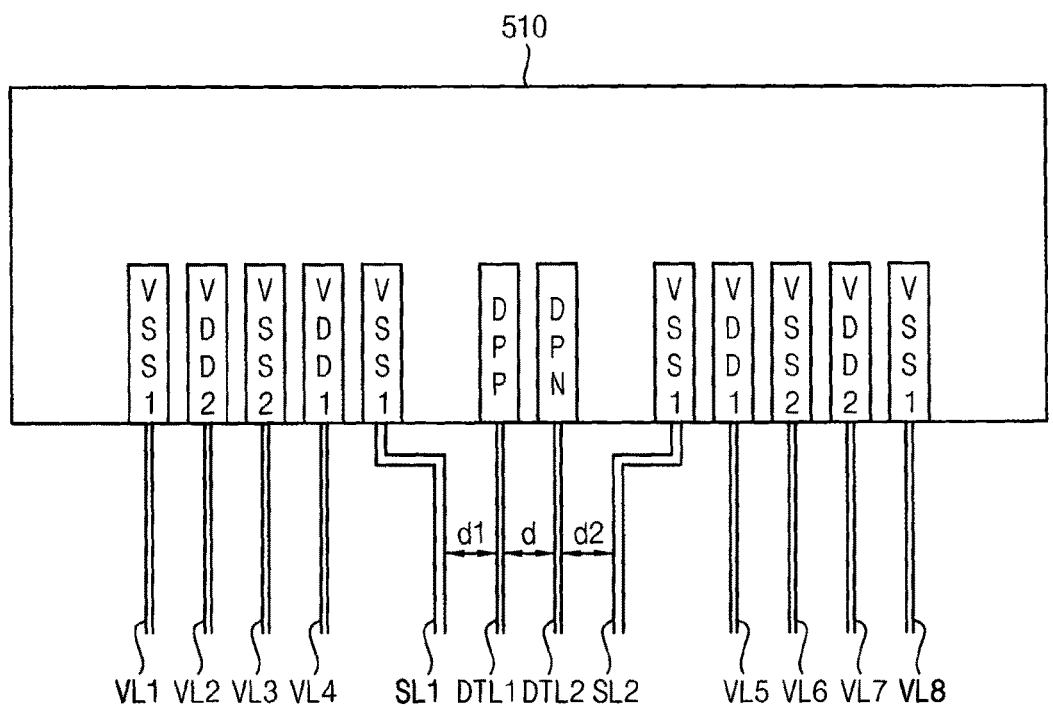
FIG. 3 is a plan view illustrating a portion A of the data driver of FIG. 2 according to an exemplary embodiment of the present system and method.

A structure of the data driver 500 is explained in reference to FIGS. 2 and 3. FIG. 2 is a plan view illustrating the display panel 100, the timing controller 200 and the data driver 500 of FIG. 1 according to an exemplary embodiment of the present system and method. FIG. 3 is a plan view illustrating a portion A of the data driver 500 of FIG. 2 according to an exemplary embodiment of the present system and method.

Referring to FIGS. 1 to 3, the data driver 500 includes a data driving chip 510 and a flexible printed circuit board 520. The flexible printed circuit board 520 connects the data driving chip 510 to a printed circuit board on which the timing controller 200 is disposed. In an exemplary embodiment, the flexible printed circuit board 520 may be a layer of the printed circuit board and integrally formed with the printed circuit board. In another exemplary embodiment, the flexible printed circuit board 520 may be independently formed from the printed circuit board.

Figure 4:
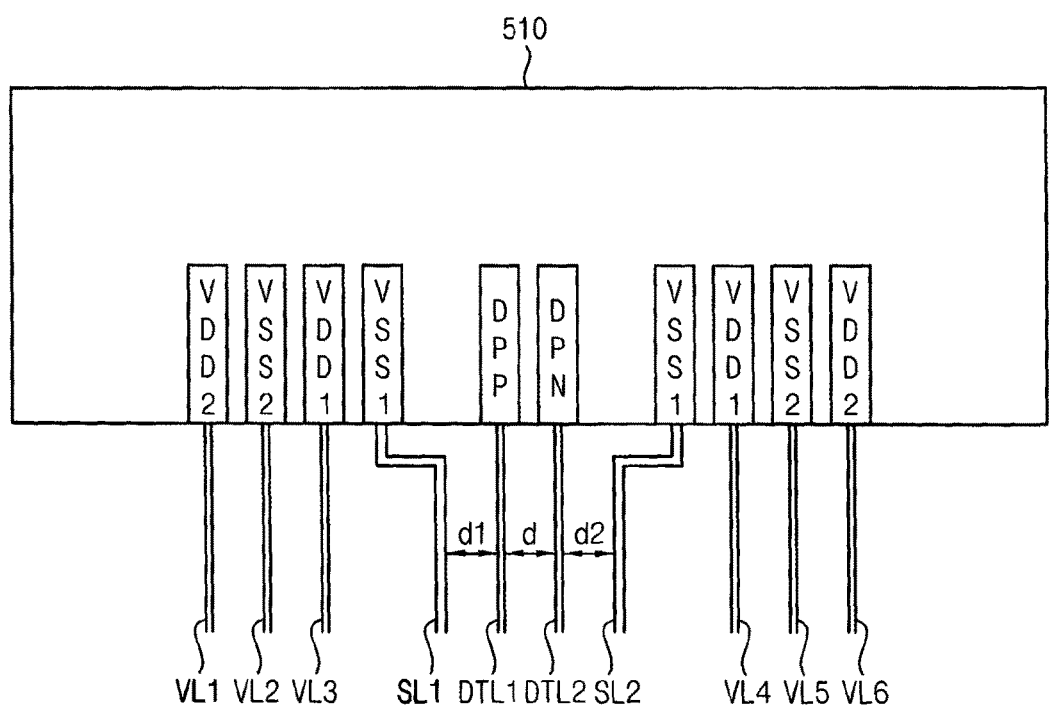
FIG. 4 is a plan view illustrating a portion A of the data driver of FIG. 2 according to an exemplary embodiment of the present system and method.

The data driver 500 further includes data transmitting lines DTL1 and DTL2 that transmit a data signal DATA to the data driving chip 510, shielding lines SL1 and SL2 that prevent noise from interfering with the data signal DATA being transmitted, and voltage transmitting lines VL1 to VL8 that transmit power voltages to the data driving chip 510. These various components of the data driver 500 (e.g., DTL1, DTL2, SL1 and SL2) are shown in FIGS. 3 and 4. FIG. 2 illustrates that the data driving chip 510 may be mounted on a non-display portion 110 (as opposed to a display portion 120) of the display panel 100 as a chip-on-glass ("COG") type. The data transmitting lines DTL1 and DTL2, the shielding lines SL1 and SL2 and the voltage transmitting lines VL1 to VL8 may also disposed on the substrate of the display panel 100. Although FIG. 2 shows that the data driver 500 includes two data driving chips 510 and two flexible printed circuit boards 520, the present system and method contemplates that any number of data driving chips 510 and flexible printed circuit boards 520 may be used The data driving chip 510 receives the data signal DATA through the data transmitting lines DTL1 and DTL2, for example, from the timing controller 200. The data driving chip 510 generates data voltages based on the data signal DATA and outputs the data voltages to the data lines DL of the display panel 100. The data driving chip 510 receives power voltages (for generating the data voltages) through the voltage transmitting lines VL1 to VL8. The power voltages may include a logic high-voltage VDD1, a logic ground voltage VSS1, an analog high-voltage VDD2 and an analog ground voltage VSS2. The analog high-voltage VDD2 may be greater than the logic high-voltage VDD1. The analog ground voltage VSS2 may be substantially equal to the logic ground voltage VSS1. The data driving chip 510 may receive the power voltages—VDD1, VSS1, VDD2 and VSS2—from the timing controller 200, or alternatively, from a power voltage generator (not shown).

The data driving chip 510 includes a first data pad DPP and a second data pad DPN for connecting to the data transmitting lines DTL1 and DTL2 and receiving the data signal DATA therefrom. The first data pad DPP may be a data positive pad and the second data pad DPN may be a data negative pad. That is, the first data transmitting line DTL1 may transmit a data positive signal to the first data pad DPP, and the second data transmitting line DTL2 may transmit a data negative signal to the second data pad DPN.

In an exemplary embodiment, a first shielding line SL1 is disposed at a first side with respect to the first data transmitting line DTL1. The first shielding line SL1 is connected to a first low-voltage terminal that is disposed at the first side with respect to the first data pad DPP. The first low-voltage terminal may be a first logic ground voltage terminal such that the logic ground voltage VSS1 is applied to the first shielding line SL1. A second shielding line SL2 is disposed at a second side with respect to the second data transmitting line DTL2. The second side is opposite to the first side. The second shielding line SL2 is connected to a second low-voltage terminal that is disposed at the second side with respect to the second data pad DPN. The second low-voltage terminal may be a second logic ground voltage terminal such that the logic ground voltage VSS1 is applied to the second shielding line SL2.

In an exemplary embodiment, the first shielding line SL1 and the second shielding line SL2 have electrical resistances that are less than those of the first data transmitting line DTL1 and the second data transmitting line DTL2. The differences in the resistances may be achieved, for example, if the widths of the first shielding line SL1 and the second shielding line SL2 are greater than the widths of the first data transmitting line DTL1 and the second data transmitting line DTL2. This prevents noise from interfering with the data signal DATA being transmitted through the data transmitting lines DTL1 and DTL2.

In an exemplary embodiment, a distance d1 between the first shielding line SL1 and the first data transmitting line DTL1 may be equal to or less than a distance d between the first data transmitting line DTL1 and the second data transmitting line DTL2. A distance d2 between the second shielding line SL2 and the second data transmitting line DTL2 may be equal to or less than the distance d between the first data transmitting line DTL1 and the second data transmitting line DTL2. This prevents noise from interfering with the data signal DATA being transmitted through the data transmitting lines DTL1 and DTL2.

In an exemplary embodiment, the first shielding line SL1 may include a first bent portion that bends toward the first data transmitting line DTL1. Similarly, the second shielding line SL2 may include a second bent portion that bends toward the second data transmitting line DTL2.

In an exemplary embodiment, a first voltage transmitting line VL1 transmits the logic ground voltage VSS1 to the data driving chip 510. A second voltage transmitting line VL2 transmits the analog high-voltage VDD2 to the data driving chip 510. A third voltage transmitting line VL3 transmits the analog ground voltage VSS2 to the data driving chip 510. A fourth voltage transmitting line VL4 transmits the logic high-voltage VDD1 to the data driving chip 510. A fifth voltage transmitting line VL5 transmits the logic high-voltage VDD1 to the data driving chip 510. A sixth voltage transmitting line VL6 transmits the analog ground voltage VSS2 to the data driving chip 510. A seventh voltage transmitting line VL7 transmits the analog high-voltage VDD2 to the data driving chip 510. An eighth voltage transmitting line VL8 transmits the logic ground voltage VSS1 to the data driving chip 510. The first to fourth voltage transmitting lines VL1 to VL4 are disposed at the first side with respect to the first shielding line SL1. The fifth to eighth voltage transmitting lines VL5 to VL8 are disposed at the second side with respect to the second shielding line SL2.

According to the exemplary embodiment of FIGS. 1 to 3, the data driver 500 includes the first shielding line SL1 and the second shielding line SL2 that surround the first data transmitting line DTL1 and the second data transmitting line DTL2. The shielding lines prevent noise from interfering with the data signal DATA being transmitted by the transmitting lines to improve the reliability of the data driver 500, and thereby, improve the display quality of the display panel 100 using the data driver 500.

Although FIG. 3 illustrates that a pair of data pads DPP and DPN and a pair of data transmitting lines DTL1 and DTL2 are disposed between the first shielding line SL1 and the second shielding line SL2, the present system and method is not limited thereto. Alternatively, for example, two pairs of data pads and two pairs of data transmitting lines may be disposed between the first shielding line SL1 and the second shielding line SL2.

FIG. 4 is a plan view illustrating a portion A of the data driver of FIG. 2 according to an exemplary embodiment of the present system and method. Referring to FIGS. 1, 2 and 4, the data driver 500 includes a data driving chip 510 and a flexible printed circuit board 520. The flexible printed circuit board 520 connects the data driving chip 510 to a printed circuit board on which the timing controller 200 is disposed.

The data driver 500 includes data transmitting lines DTL1 and DTL2 that transmit a data signal DATA to the data driving chip 510, shielding lines SL1 and SL2 that prevent noise from interfering with data signal DATA being transmitted, and voltage transmitting lines VL1 to VL6 that transmit power voltages to the data driving chip 510.

The data driving chip 510 receives the data signal DATA through the data transmitting lines DTL1 and DTL2. The data driving chip 510 generates data voltages based on the data signal DATA and outputs the data voltages to the data lines DL of the display panel 100. The data driving chip 510 receives power voltages (for generating the data voltages) through the voltage transmitting lines VL1 to VL6. The power voltages may include a logic high-voltage VDD1, a logic ground voltage VSS1, an analog high-voltage VDD2 and an analog ground voltage VSS2.

In an exemplary embodiment, a first shielding line SL1 is disposed at a first side with respect to the first data transmitting line DTL1. The first shielding line SL1 is connected to a first low-voltage terminal that is disposed at the first side with respect to the first data pad DPP. The first low-voltage terminal may be a first logic ground voltage terminal such that the logic ground voltage VSS1 is applied to the first shielding line SL1. A second shielding line SL2 is disposed at a second side with respect to the second data transmitting line DTL2. The second side is opposite to the first side. The second shielding line SL2 is connected to a second low-voltage terminal that is disposed at the second side with respect to the second data pad DPN. The second low-voltage terminal may be a second logic ground voltage terminal such that the logic ground voltage VSS1 is applied to the second shielding line SL2.

A first voltage transmitting line VL1 transmits the analog high-voltage VDD2 to the data driving chip 510. A second voltage transmitting line VL2 transmits the analog ground voltage VSS2 to the data driving chip 510. A third voltage transmitting line VL3 transmits the logic high-voltage VDD1 to the data driving chip 510. A fourth voltage transmitting line VL4 transmits the logic high-voltage VDD1 to the data driving chip 510. A fifth voltage transmitting line VL5 transmits the analog ground voltage VSS2 to the data driving chip 510. A sixth voltage transmitting line VL6 transmits the analog high-voltage VDD2 to the data driving chip 510.

According to the exemplary embodiment of FIG. 4, the data driver 500 includes the first shielding line SL1 and the second shielding line SL2 that surround the first data transmitting line DTL1 and the second data transmitting line DTL2. The shielding lines prevent noise from interfering with the data signal DATA being transmitted by the transmitting lines to improve the reliability of the data driver 500, and thereby, improve the display quality of the display panel 100 using the data driver 500.

Figure 5:
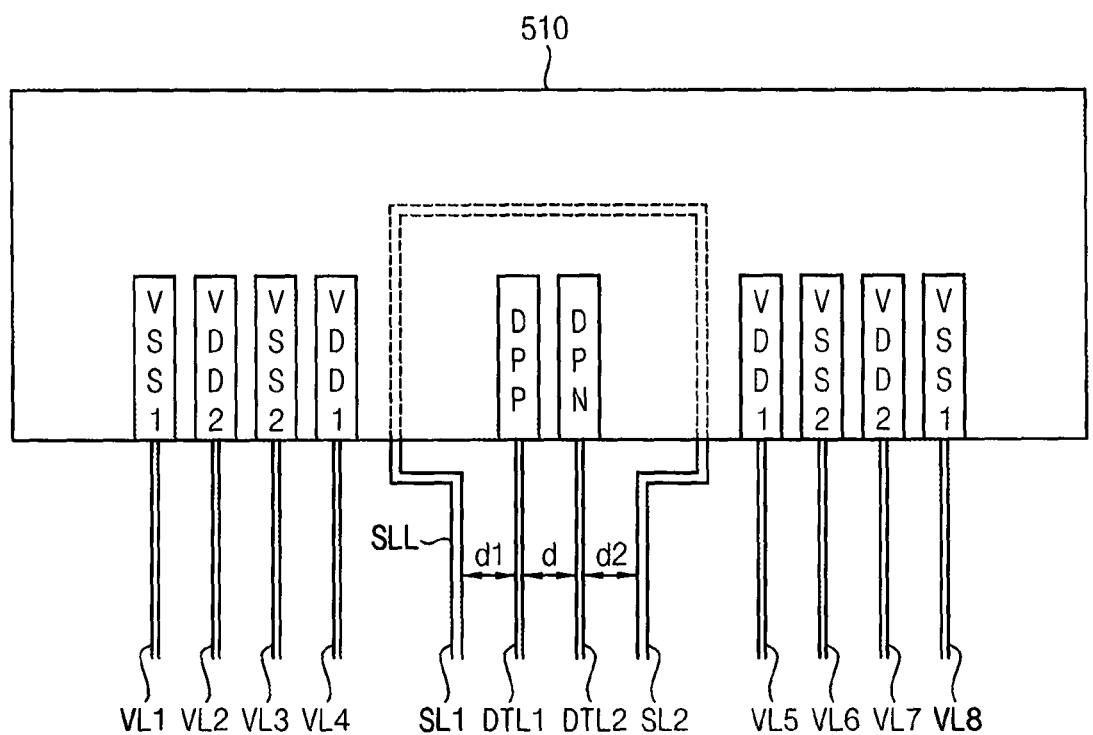
FIG. 5 is a plan view illustrating a portion A of the data driver of FIG. 2 according to an exemplary embodiment of the present system and method.
Figure 6:
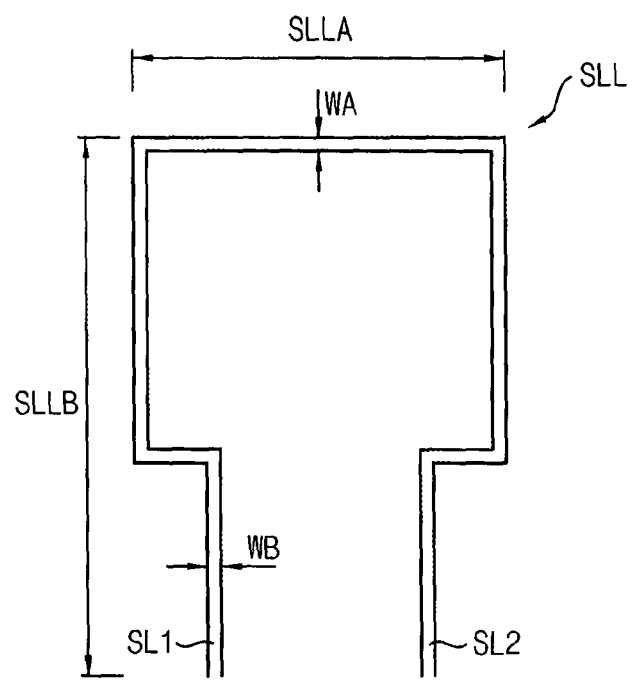
FIG. 6 is a plan view illustrating a loop shape of a shielding line of FIG. 5.

FIG. 5 is a plan view illustrating a portion A of the data driver of FIG. 2 according to an exemplary embodiment of the present system and method. FIG. 6 is a plan view illustrating a loop shape of a shielding line of FIG. 5. Referring to FIGS. 1, 2, 5 and 6, the data driver 500 includes a data driving chip 510 and a flexible printed circuit board 520. The flexible printed circuit board 520 connects the data driving chip 510 to a printed circuit board on which the timing controller 200 is disposed.

The data driver 500 includes data transmitting lines DTL1 and DTL2 that transmit a data signal DATA to the data driving chip 510, shielding lines SL1 and SL2 that prevent noise from interfering with the data signal DATA being transmitted, and voltage transmitting lines VL1 to VL8 that transmit power voltages to the data driving chip 510.

The data driving chip 510 receives the data signal DATA through the data transmitting lines DTL1 and DTL2. The data driving chip 510 generates data voltages based on the data signal DATA and outputs the data voltages to the data lines DL of the display panel 100. The data driving chip 510 receives power voltages (for generating the data voltages) through the voltage transmitting lines VL1 to VL8. The power voltages may include a logic high-voltage VDD1, a logic ground voltage VSS1, an analog high-voltage VDD2 and an analog ground voltage VSS2.

In an exemplary embodiment, a first shielding line SL1 is disposed at a first side with respect to the first data transmitting line DTL1. A second shielding line SL2 is disposed at a second side with respect to the second data transmitting line DTL2. The second side is opposite to the first side. The first shielding line SL1 and the second shielding line SL2 are not connected to a pad of the data driving chip 510. A ground voltage is applied to the first shielding line SL1 and the second shielding line SL2.

In an exemplary embodiment, the first shielding line SL1 and the second shielding line SL2 have electrical resistances that are less than those of the first data transmitting line DTL1 and the second data transmitting line DTL2. A distance d1 between the first shielding line SL1 and the first data transmitting line DTL1 may be equal to or less than a distance d between the first data transmitting line DTL1 and the second data transmitting line DTL2.

In an exemplary embodiment, the first shielding line SL1 and the second shielding line SL2 are connected to each other through a connecting portion to form a shielding line loop SLL, such as shown in FIG. 6. The shielding line loop SLL includes a first portion SLLA that includes the connecting portion and a second portion SLLB that includes the first shielding line SL1 and the second shielding line SL2.

In an exemplary embodiment, a resistance of a unit length of the first portion SLLA (e.g. the connecting portion) is substantially the same as a resistance of a unit length of the second portion SLLB (e.g. the first shielding line SL1). The same or similar resistance per unit length may be achieved, for example, if a width WA of the first portion SLLA is substantially the same as a width WB of the second portion SLLB.

According to the exemplary embodiment of FIGS. 5 and 6, the data driver 500 includes the shielding line loop SLL that surrounds the first data transmitting line DTL1 and the second data transmitting line DTL2. The shielding line loop SLL prevents noise from interfering with the data signal DATA being transmitted by the transmitting lines to improve the reliability of the data driver 500, and thereby, improve the display quality of the display panel 100 using the data driver 500.

Figure 7:
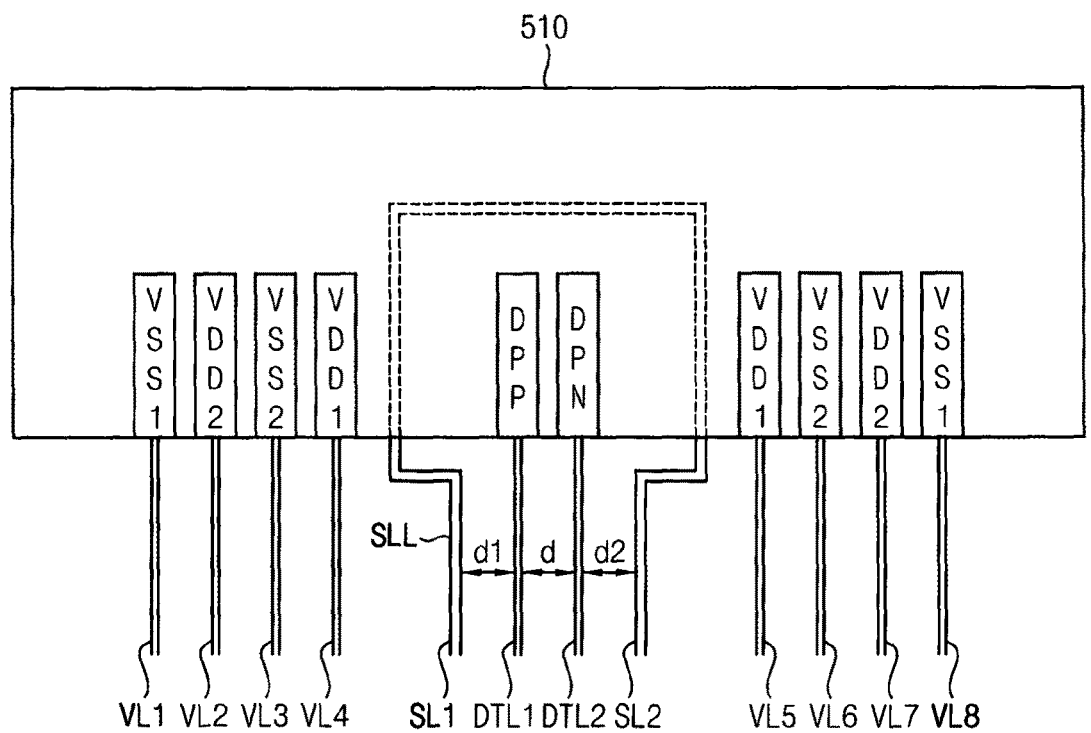
FIG. 7 is a plan view illustrating a portion A of the data driver of FIG. 2 according to an exemplary embodiment of the present system and method.
Figure 8:
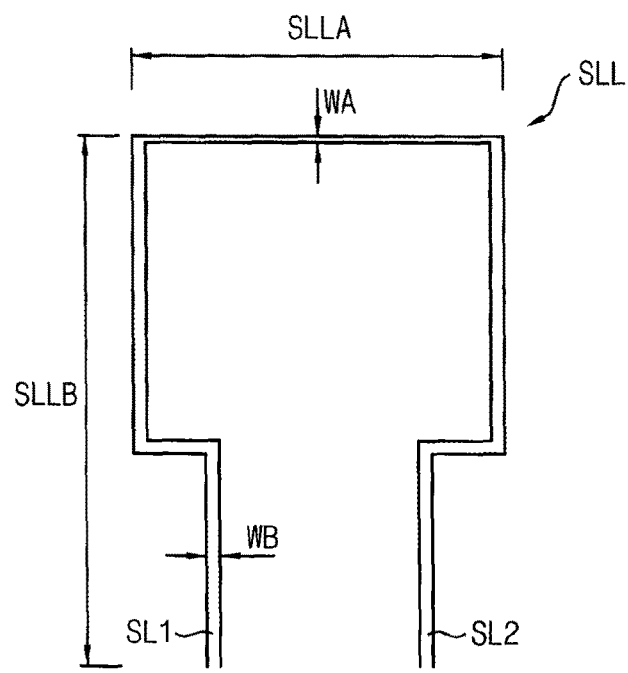
FIG. 8 is a plan view illustrating a loop shape of a shielding line of FIG. 7.

FIG. 7 is a plan view illustrating a portion A of the data driver of FIG. 2 according to an exemplary embodiment of the present system and method. FIG. 8 is a plan view illustrating a loop shape of a shielding line of FIG. 7. Referring to FIGS. 1, 2, 7 and 8, the data driver 500 includes a data driving chip 510 and a flexible printed circuit board 520. The flexible printed circuit board 520 connects the data driving chip 510 to a printed circuit board on which the timing controller 200 is disposed.

The data driver 500 includes data transmitting lines DTL1 and DTL2 that transmit a data signal DATA to the data driving chip 510, shielding lines SL1 and SL2 that prevent noise from interfering with the data signal DATA being transmitted, and voltage transmitting lines VL1 to VL8 that transmit power voltages to the data driving chip 510.

The data driving chip 510 receives the data signal DATA through the data transmitting lines DTL1 and DTL2. The data driving chip 510 generates data voltages based on the data signal DATA and outputs the data voltages to the data lines DL of the display panel 100. The data driving chip 510 receives power voltages (for generating the data voltages) through the voltage transmitting lines VL1 to VL8. The power voltages may include a logic high-voltage VDD1, a logic ground voltage VSS1, an analog high-voltage VDD2 and an analog ground voltage VSS2.

In an exemplary embodiment, a first shielding line SL1 is disposed at a first side with respect to the first data transmitting line DTL1. A second shielding line SL2 is disposed at a second side with respect to the second data transmitting line DTL2. The second side is opposite to the first side. The first shielding line SL1 and the second shielding line SL2 are not connected to a pad of the data driving chip 510. A ground voltage is applied to the first shielding line SL1 and the second shielding line SL2.

In an exemplary embodiment, resistances of the first shielding line SL1 and the second shielding line SL2 are less than resistances of the first data transmitting line DTL1 and the second data transmitting line DTL2. A distance d1 between the first shielding line SL1 and the first data transmitting line DTL1 may be equal to or less than a distance d between the first data transmitting line DTL1 and the second data transmitting line DTL2.

In an exemplary embodiment, the first shielding line SL1 and the second shielding line SL2 are connected to each other through a connecting portion to form a shielding line loop SLL, such as shown in FIG. 7. The shielding line loop SLL includes a first portion SLLA that includes the connecting portion and a second portion SLLB that includes the first shielding line SL1 and the second shielding line SL2.

In an exemplary embodiment, a resistance of a unit length of the first portion SLLA (e.g. the connecting portion) is greater than a resistance of a unit length of the second portion SLLB (e.g. the first shielding line SL1). FIG. 8 illustrates that the difference in resistance of a unit length may be achieved, for example, if a width WA of the first portion SLLA is less than a width WB of the second portion SLLB. Having a relatively high resistance in the first portion SLLA prevents or otherwise reduces distortion of the data signal DATA in the second data transmitting line DTL2 that may be caused by coupling between the first data line DTL1 and the first shielding line SL1. Vice versa, it prevents distortion of the data signal DATA in the first data transmitting line DTL1 that may be caused by coupling between the second data line DTL2 and the second shielding line SL2.

According to the exemplary embodiment of FIGS. 7 and 8, the data driver 500 includes the shielding line loop SLL that surrounds the first data transmitting line DTL1 and the second data transmitting line DTL2. The shield line loop SLL prevents noise from interfering with the data signal DATA being transmitted by the transmitting lines to improve the reliability of the data driver 500, and thereby, improve the display quality of the display panel 100 using the data driver 500.

Figure 9:
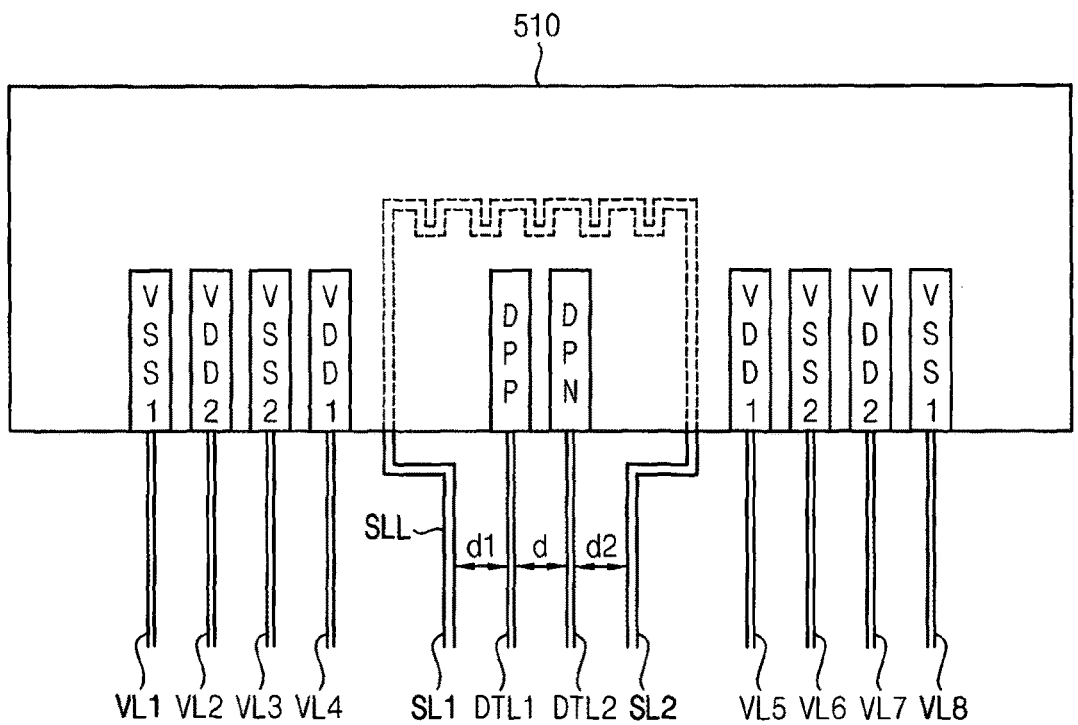
FIG. 9 is a plan view illustrating a portion A of the data driver of FIG. 2 according to an exemplary embodiment of the present system and method.
Figure 10:
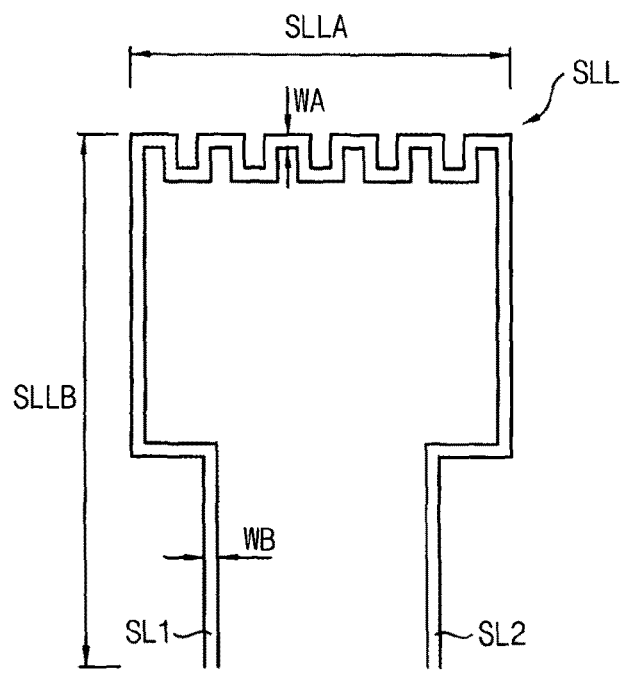
FIG. 10 is a plan view illustrating a loop shape of a shielding line of FIG. 9.

FIG. 9 is a plan view illustrating a portion A of the data driver of FIG. 2 according to an exemplary embodiment of the present system and method. FIG. 10 is a plan view illustrating a loop shape of a shielding line of FIG. 9. Referring to FIGS. 1, 2, 9 and 10, the data driver 500 includes a data driving chip 510 and a flexible printed circuit board 520. The flexible printed circuit board 520 connects the data driving chip 510 to a printed circuit board on which the timing controller 200 is disposed.

The data driver 500 includes data transmitting lines DTL1 and DTL2 that transmit a data signal DATA to the data driving chip 510, shielding lines SL1 and SL2 that prevent noise from interfering with the data signal DATA being transmitted, and voltage transmitting lines VL1 to VL8 that transmit power voltages to the data driving chip 510.

The data driving chip 510 receives the data signal DATA through the data transmitting lines DTL1 and DTL2. The data driving chip 510 generates data voltages based on the data signal DATA and outputs the data voltages to the data lines DL of the display panel 100. The data driving chip 510 receives power voltages (for generating the data voltage) through the voltage transmitting lines VL1 to VL8. The power voltages may include a logic high-voltage VDD1, a logic ground voltage VSS1, an analog high-voltage VDD2 and an analog ground voltage VSS2.

In an exemplary embodiment, a first shielding line SL1 is disposed at a first side with respect to the first data transmitting line DTL1. A second shielding line SL2 is disposed at a second side with respect to the second data transmitting line DTL2. The second side is opposite to the first side. The first shielding line SL1 and the second shielding line SL2 are not connected to a pad of the data driving chip 510. A ground voltage is applied to the first shielding line SL1 and the second shielding line SL2.

In an exemplary embodiment, resistances of the first shielding line SL1 and the second shielding line SL2 are less than resistances of the first data transmitting line DTL1 and the second data transmitting line DTL2. A distance d1 between the first shielding line SL1 and the first data transmitting line DTL1 may be equal to or less than a distance d between the first data transmitting line DTL1 and the second data transmitting line DTL2.

In an exemplary embodiment, the first shielding line SL1 and the second shielding line SL2 are connected to each other through a connecting portion to form a shielding line loop SLL. The shielding line loop SLL includes a first portion SLLA that includes the connecting portion and a second portion SLLB which includes the first shielding line SL1 and the second shielding line SL2.

In an exemplary embodiment, a resistance of a unit length of the first portion SLLA (e.g. the connecting portion) is greater than a resistance of a unit length of the second portion SLLB (e.g. the first shielding line SL1). For example, as FIG. 10 illustrates, the first portion SLLA may include a convex and concave pattern, such as a square-wave pattern, that increases its resistance per unit length. Having a relatively high resistance in the connecting portion prevents or otherwise reduces distortion of the data signal DATA in the second data transmitting line DTL2 that may be caused by coupling between the first data line DTL1 and the first shielding line SL1. Vice versa, it prevents distortion of the data signal DATA in the first data transmitting line DTL1 that may be caused by coupling between the second data line DTL2 and the second shielding line SL2.

According to the exemplary embodiment of FIGS. 9 and 10, the data driver 500 includes the shielding line loop SLL that surrounds the first data transmitting line DTL1 and the second data transmitting line DTL2. The shielding line loop SLL prevents noise from interfering with the data signal DATA being transmitted by the transmitting lines to improve the reliability of the data driver 500, and thereby, improve the display quality of the display panel 100 using the data driver 500.

Figure 11:
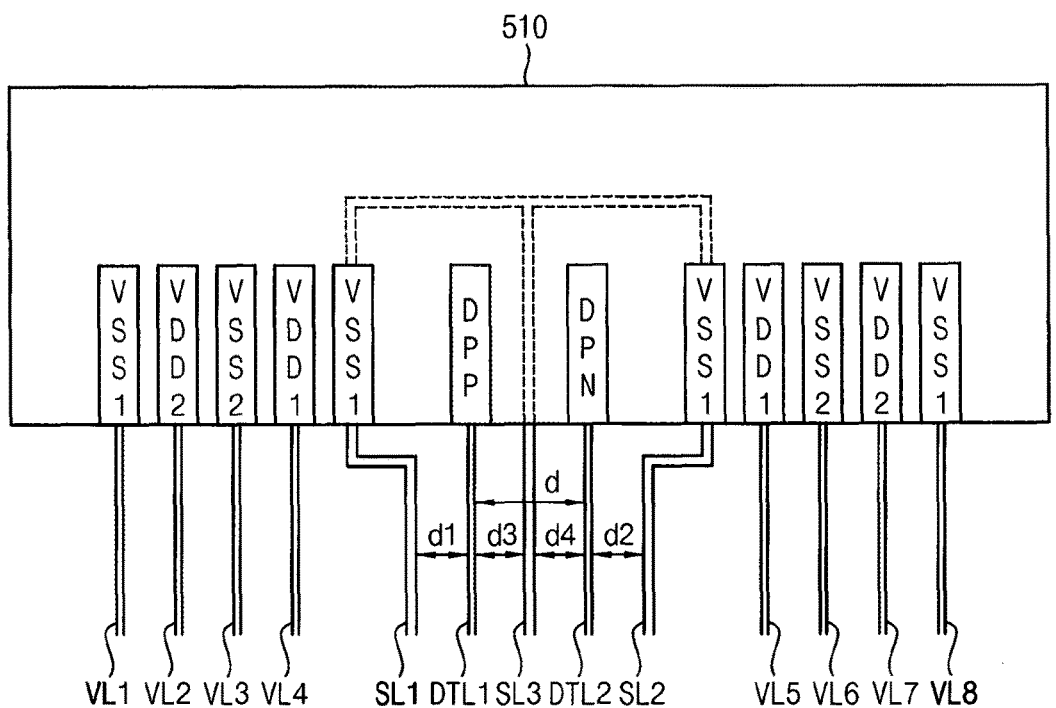
FIG. 11 is a plan view illustrating a portion A of the data driver of FIG. 2 according to an exemplary embodiment of the present system and method.

FIG. 11 is a plan view illustrating a portion A of the data driver of FIG. 2 according to an exemplary embodiment of the present system and method. Referring to FIGS. 1, 2 and 11, the data driver 500 includes a data driving chip 510 and a flexible printed circuit board 520. The flexible printed circuit board 520 connects the data driving chip 510 to a printed circuit board on which the timing controller 200 is disposed.

The data driver 500 includes data transmitting lines DTL1 and DTL2 that transmit a data signal DATA to the data driving chip 510, shielding lines SL1, SL2 and SL3 that prevent noise from interfering with the data signal DATA being transmitted, and voltage transmitting lines VL1 to VL8 transmitting a power voltage to the data driving chip 510.

The data driving chip 510 receives the data signal DATA through a first data pad DPP and a second data pad DPN that are connected to the data transmitting lines DTL1 and DTL2. The first data pad DPP and the second data pad DPN may be spaced apart from each other. The data driving chip 510 generates data voltages based on the data signal DATA and outputs the data voltages to the data lines DL of the display panel 100. The data driving chip 510 receives power voltages (for generating the data voltages) through the voltage transmitting lines VL1 to VL8. The power voltages may include a logic high-voltage VDD1, a logic ground voltage VSS1, an analog high-voltage VDD2 and an analog ground voltage VSS2.

In an exemplary embodiment, a first shielding line SL1 is disposed at a first side with respect to the first data transmitting line DTL1. The first shielding line SL1 is connected to a first low-voltage terminal that is disposed at the first side with respect to the first data pad DPP. The first low-voltage terminal may be a first logic ground voltage terminal such that the logic ground voltage VSS1 is applied to the first shielding line SL1. A second shielding line SL2 is disposed at a second side with respect to the second data transmitting line DTL2. The second side is opposite to the first side. The second shielding line SL2 is connected to a second low-voltage terminal that is disposed at the second side with respect to the second data pad DPN. The second low-voltage terminal may be a second logic ground voltage terminal such that the logic ground voltage VSS1 is applied to the second shielding line SL2. A third shielding line SL3 is disposed between the first data transmitting line DTL1 and the second data transmitting line DTL2. The third shielding SL3 is connected to the first logic ground voltage terminal and the second logic ground voltage terminal such that the logic ground voltage VSS1 is applied to the third shielding line SL3. A shape of the third shielding line SL3 may include a T-shape.

In an exemplary embodiment, resistances of the first shielding line SL1, the second shielding line SL2 and the third shielding line SL3 are less than resistances of the first data transmitting line DTL1 and the second data transmitting line DTL2. A distance d1 between the first shielding line SL1 and the first data transmitting line DTL1 may be less than a distance d between the first data transmitting line DTL1 and the second data transmitting line DTL2. A distance d2 between the second shielding line SL2 and the second data transmitting line DTL2 may be less than the distance d between the first data transmitting line DTL1 and the second data transmitting line DTL2. A distance d3 between the third shielding line SL3 and the first data transmitting line DTL1 may be equal to the distance d1 between the first shielding line SL1 and the first data transmitting line DTL1. A distance d4 between the third shielding line SL3 and the second data transmitting line DTL2 may be equal to the distance d2 between the second shielding line SL2 and the second data transmitting line DTL2.

According to the exemplary embodiment of FIG. 11, the data driver 500 includes the first shielding line SL1 and the second shielding line SL2 that surround the first data transmitting line DTL1 and the second data transmitting line DTL2. The data driver 500 also includes the third shielding line SL3 that is disposed between the data transmitting line DTL1 and the second data transmitting line DTL2. The shield lines prevent noise from interfering with the data signal DATA being transmitted by the transmitting lines to improve the reliability of the data driver 500, and thereby, improve the display quality of the display panel 100 using the data driver 500.

Although FIG. 11 illustrates that a first data pad DPP and a data transmitting line DTL1 are disposed between the first shielding line SL1 and the third shielding line SL3 and a second data pad DPN and a data transmitting line DTL2 are disposed between the third shielding line SL3 and the second shielding line SL2, the present system and method is not limited thereto. Alternatively, for example, a pair of data pads and a pair of data transmitting lines may be disposed between the first shielding line SL1 and the third shielding line SL3 and a pair of data pads and a pair of data transmitting lines may be disposed between the third shielding line SL3 and the second shielding line SL2.

Figure 12:
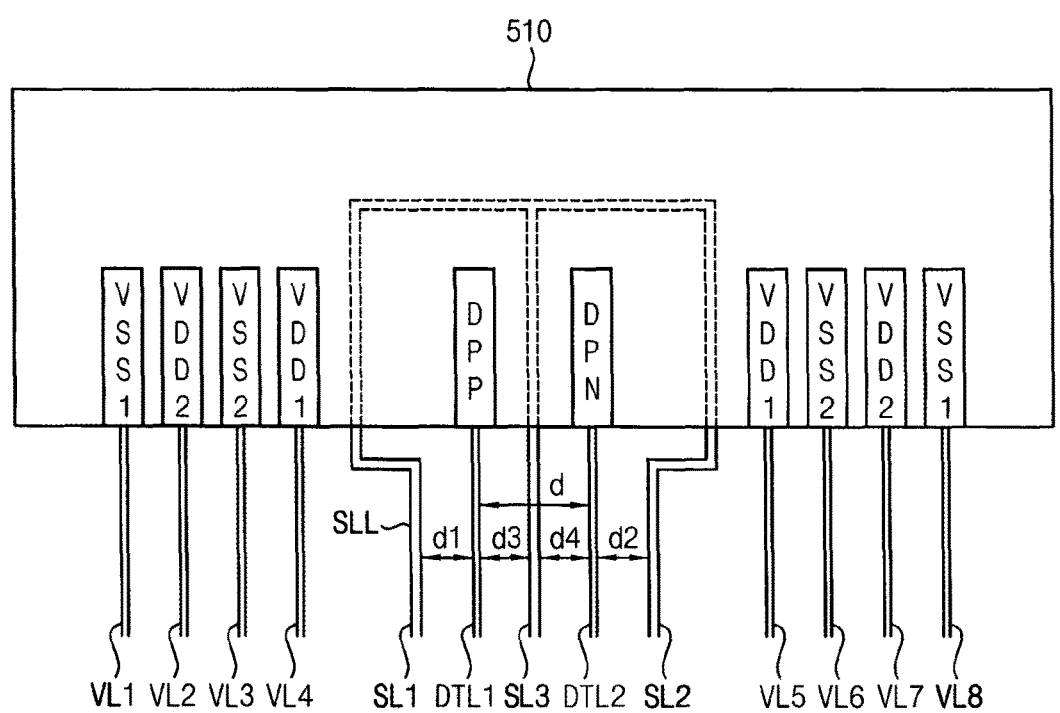
FIG. 12 is a plan view illustrating a portion A of the data driver of FIG. 2 according to an exemplary embodiment of the present system and method.
Figure 13:
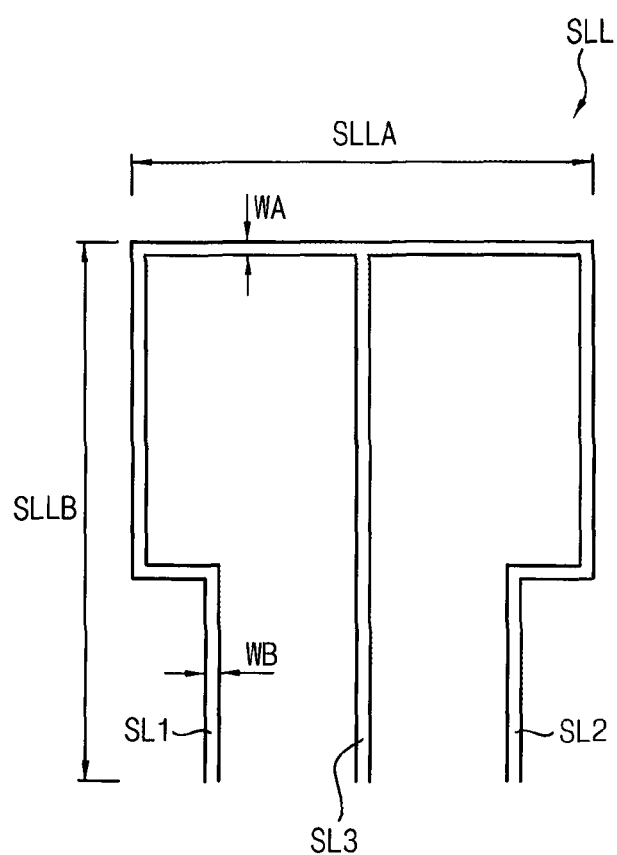
FIG. 13 is a plan view illustrating a loop shape of a shielding line of FIG. 12.

FIG. 12 is a plan view illustrating a portion A of the data driver of FIG. 2 according to an exemplary embodiment of the present system and method. FIG. 13 is a plan view illustrating a loop shape of a shielding line of FIG. 12. Referring to FIGS. 1, 2, 12 and 13, the data driver 500 includes a data driving chip 510 and a flexible printed circuit board 520. The flexible printed circuit board 520 connects the data driving chip 510 to a printed circuit board on which the timing controller 200 is disposed.

The data driver 500 includes data transmitting lines DTL1 and DTL2 that transmit a data signal DATA to the data driving chip 510, shielding lines SL1, SL2 and SL3 that prevent noise from interfering with the data signal DATA being transmitted, and voltage transmitting lines VL1 to VL8 that transmit power voltages to the data driving chip 510.

The data driving chip 510 receives the data signal DATA through the data transmitting lines DTL1 and DTL2. The data driving chip 510 generates data voltages based on the data signal DATA and outputs the data voltages to the data lines DL of the display panel 100. The data driving chip 510 receives power voltages (for generating the data voltages) through the voltage transmitting lines VL1 to VL8. The power voltages may include a logic high-voltage VDD1, a logic ground voltage VSS1, an analog high-voltage VDD2 and an analog ground voltage VSS2.

In an exemplary embodiment, a first shielding line SL1 is disposed at a first side with respect to the first data transmitting line DTL1. A second shielding line SL2 is disposed at a second side with respect to the second data transmitting line DTL2. The second side is opposite to the first side. A third shielding line SL3 is disposed between the first data transmitting line DTL1 and the second data transmitting line DTL2. The first shielding line SL1, the second shielding line SL2 and the third shielding line SL3 are not connected to a pad of the data driving chip 510. A ground voltage is applied to the first shielding line SL1, the second shielding line SL2 and the third shielding line SL3.

In an exemplary embodiment, resistances of the first shielding line SL1, the second shielding line SL2 and the third shielding line SL3 are less than resistances of the first data transmitting line DTL1 and the second data transmitting line DTL2. A distance d1 between the first shielding line SL1 and the first data transmitting line DTL1 may be less than a distance d between the first data transmitting line DTL1 and the second data transmitting line DTL2. A distance d2 between the second shielding line SL2 and the second data transmitting line DTL2 may be less than the distance d between the first data transmitting line DTL1 and the second data transmitting line DTL2. A distance d3 between the third shielding line SL3 and the first data transmitting line DTL1 may be equal to the distance d1 between the first shielding line SL1 and the first data transmitting line DTL1. A distance d4 between the third shielding line SL3 and the second data transmitting line DTL2 may be equal to the distance d2 between the second shielding line SL2 and the second data transmitting line DTL2.

In an exemplary embodiment, the first shielding line SL1, the second shielding line SL2 and the third shielding line SL3 are connected to each other through a connecting portion to form a shielding line loop SLL. The shielding line loop SLL includes a first portion SLLA that includes the connecting portion and a second portion SLLB that includes the first shielding line SL1, the second shielding line SL2 and the third shielding line SL3.

In an exemplary embodiment, a resistance of a unit length of the first portion SLLA (e.g. the connecting portion) is substantially the same as a resistance of a unit length of the second portion SLLB (e.g. the first shielding line SL1). The same or similar resistance per unit length may be achieved, for example, if a width WA of the first portion SLLA is substantially the same as a width WB of the second portion SLLB. Alternatively, in another exemplary embodiment, a resistance of a unit length of the first portion SLLA (e.g. the connecting portion) is greater than a resistance of a unit length of the second portion SLLB (e.g. the first shielding line SL1). The difference in resistance per unit length may be achieved, for example, if a width WA of the first portion SLLA is less than a width WB of the second portion SLLB (such as shown in FIG. 8), or if the first portion SLLA includes a convex and concave pattern that increases the resistance of a unit length (such as the square-wave pattern shown in FIG. 10).

According to the exemplary embodiment of FIGS. 12 and 13, the data driver 500 includes the shielding line loop SLL that surrounds the first data transmitting line DTL1 and the second data transmitting line DTL2. The shielding line loop SLL prevents noise from interfering with the data signal DATA being transmitted by the transmitting lines to improve the reliability of the data driver 500, and thereby, improve the display quality of the display panel 100.

Figure 14:
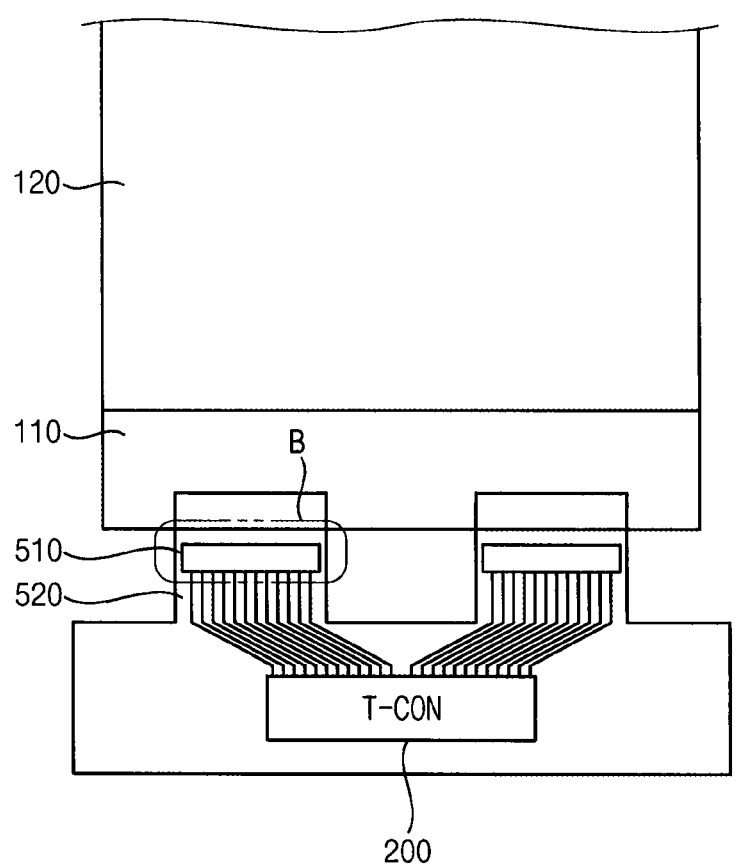
FIG. 14 is a plan view illustrating a display panel, a timing controller and a data driver of FIG. 1 according to an exemplary embodiment of the present system and method.
Figure 15:
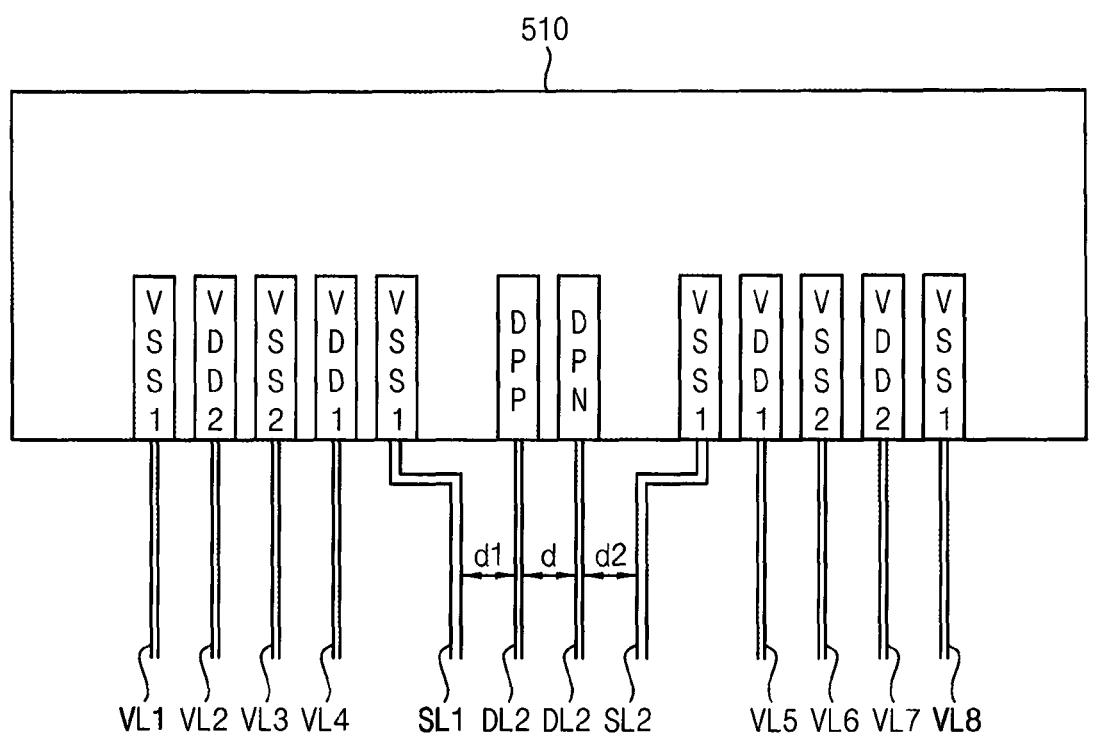
FIG. 15 is a plan view illustrating a portion B of the data driver of FIG. 14.

FIG. 14 is a plan view illustrating a display panel, a timing controller and a data driver of FIG. 1 according to an exemplary embodiment of the present system and method. FIG. 15 is a plan view illustrating a portion B of the data driver of FIG. 14. Referring to FIGS. 1, 14 and 15, the data driver 500 includes a data driving chip 510 and a flexible printed circuit board 520. The flexible printed circuit board 520 connects the data driving chip 510 to a printed circuit board on which the timing controller 200 is disposed. The flexible printed circuit board 520 may be a layer of the printed circuit board and integrally formed with the printed circuit board. In another exemplary embodiment, the flexible printed circuit board 520 may be independently formed from the printed circuit board.

As FIG. 14 illustrates, the data driver 500 includes data transmitting lines DTL1 and DTL2 that transmit a data signal DATA to the data driving chip 510, shielding lines SL1 and SL2 that prevent noise from interfering with the data signal DATA being transmitted, and voltage transmitting lines VL1 to VL8 that transmit power voltages to the data driving chip 510. The embodiment of FIG. 14 differs from that of FIG. 2 at least in that the data driving chip 510 of FIG. 14 is mounted on the flexible printed circuit board 520 as a chip-on-film ("COF") type, whereas the data driving chip 510 of FIG. 2 is mounted on a substrate of the display panel 100. Also, here, the data transmitting lines DTL1 and DTL2, the shielding lines SL1 and SL2 and the voltage transmitting lines VL1 to VL8 are disposed on the flexible printed circuit board 520 instead of the display panel 100.

The data driving chip 510 includes a first data pad DPP and a second data pad DPN for connecting to the data transmitting lines DTL1 and DTL2 and receiving the data signal DATA therefrom. The data driving chip 510 generates data voltages based on the data signal DATA and outputs the data voltages to the data lines DL of the display panel 100. The data driving chip 510 receives power voltages (for generating the data voltages) through the voltage transmitting lines VL1 to VL8. The power voltages may include a logic high-voltage VDD1, a logic ground voltage VSS1, an analog high-voltage VDD2 and an analog ground voltage VSS2.

In an exemplary embodiment, a first shielding line SL1 is disposed at a first side with respect to the first data transmitting line DTL1. The first shielding line SL1 is connected to a first low-voltage terminal that is disposed at the first side with respect to the first data pad DPP. The first low-voltage terminal may be a first logic ground voltage terminal such that the logic ground voltage VSS1 is applied to the first shielding line SL1. A second shielding line SL2 is disposed at a second side with respect to the second data transmitting line DTL2. The second side is opposite to the first side. The second shielding line SL2 is connected to a second low-voltage terminal that is disposed at the second side with respect to the second data pad DPN. The second low-voltage terminal may be a second logic ground voltage terminal such that the logic ground voltage VSS1 is applied to the second shielding line SL2.

In an exemplary embodiment, resistances of the first shielding line SL1 and the second shielding line SL2 are less than resistances of the first data transmitting line DTL1 and the second data transmitting line DTL2. A distance d1 between the first shielding line SL1 and the first data transmitting line DTL1 may be equal to or less than a distance d between the first data transmitting line DTL1 and the second data transmitting line DTL2.

According to the exemplary embodiment of FIGS. 14 and 15, the data driver 500 includes the first shielding line SL1 and the second shielding line SL2 that surround the first data transmitting line DTL1 and the second data transmitting line DTL2. The shielding lines prevent noise from interfering with the data signal DATA being transmitted by the transmitting lines to improve the reliability of the data driver 500, and thereby improve the display quality of the display panel 100 using the data driver 500.

The foregoing is illustrative of the present system and method and is not to be construed as limiting thereof. Although a few exemplary embodiments of the present system and method have been described, those skilled in the art would readily appreciate that many modifications are possible in the exemplary embodiments without materially departing from the novel teachings and advantages of the present system and method. Accordingly, all such modifications are intended to be included within the scope of the present system and method.

What is claimed is:

1. A data driver comprising:
a data driving chip;
a first data transmitting line and a second data transmitting line connected between a timing controller and the data driving chip, and configured to transmit a data signal from the timing controller to the data driving chip;
a first shielding line disposed at a first side with respect to the first data transmitting line, a ground voltage being applied to the first shielding line; and
a second shielding line disposed at a second side with respect to the second data transmitting line, the second side being opposite to the first side, the ground voltage being applied to the second shielding line,
wherein the first shielding line includes a first bent portion that bends toward the first data transmitting line so that a first portion of the first shielding line has a first distance from the first data transmitting line and a second portion of the first shielding line has a second distance from the first data transmitting line less than the first distance,
the second shielding line includes a second bent portion that bends toward the second data transmitting line so that a first portion of the second shielding line has a third distance from the second data transmitting line and a second portion of the second shielding line has a fourth distance from the second data transmitting line less than the third distance, and
the first portion of the first shielding line having the first distance greater than the second distance and the first portion of the second shielding line having the third distance greater than the fourth distance are disposed closer to the data driving chip than the second portion of the first shielding line and the second portion of the second shielding line,
further comprising a connecting portion that connects the first shielding line and the second shielding line to surround a first data pad and a second data pad connected to the first data transmitting line and the second data transmitting line, respectively.

2. The data driver of claim 1, wherein resistances of the first shielding line and the second shielding line are less than resistances of the first data transmitting line and the second data transmitting line.

3. The data driver of claim 1, wherein the first shielding line is connected to a first low-voltage terminal of the data driving chip, and the second shielding line is connected to a second low-voltage terminal of the data driving chip.

4. The data driver of claim 1, wherein a resistance of the connecting portion is equal to or greater than a resistance of the first shielding line.

5. The data driver of claim 4, wherein a width of the connecting portion is less than a width of the first shielding line.

6. The data driver of claim 4, wherein the connecting portion includes a convex and concave pattern.

7. The data driver of claim 1, further comprising a third shielding line disposed between the first data transmitting line and the second data transmitting line, the ground voltage being applied to the third shielding line.

8. The data driver of claim 7, wherein the first shielding line is connected to a first low-voltage terminal of the data driving chip,
the second shielding line is connected to a second low-voltage terminal of the data driving chip, and
the third shielding line is connected to both the first low-voltage terminal and the second low-voltage terminal of the data driving chip.

9. The data driver of claim 7, further comprising a connecting portion that connects the first shielding line, the second shielding line and the third shielding line.

10. The data driver of claim 1, further comprising:
a first voltage transmitting line disposed at the first side of the first shielding line; and
a second voltage transmitting line disposed at the second side of the second shielding line.

11. The data driver of claim 1, wherein the data driving chip, the first shielding line and the second shielding line are disposed on a substrate of a display panel.

12. The data driver of claim 1, further comprising a flexible printed circuit board on which the data driving chip is mounted, wherein the first shielding line and the second shielding line are disposed on the flexible printed circuit board.

13. The data driver of claim 1, wherein a distance between the first shielding line and the first data transmitting line is equal to or less than a distance between the first data transmitting line and the second data transmitting line, and a distance between the second shielding line and the second data transmitting line is equal to or less than the distance between the first data transmitting line and the second data transmitting line.

14. A display apparatus comprising:
a display panel configured to display an image;
a gate driver configured to apply a gate signal to the display panel; and
a data driver configured to apply a data voltage to the display panel, the data driver comprising:
a data driving chip;
a first data transmitting line and a second data transmitting line connected between a timing controller and the data driving chip, and configured to transmit a data signal from the timing controller to the data driving chip;
a first shielding line disposed at a first side with respect to the first data transmitting line, a ground voltage being applied to the first shielding line; and
a second shielding line disposed at a second side with respect to the second data transmitting line, the second side being opposite to the first side, the ground voltage being applied to the second shielding line,
wherein the first shielding line includes a first bent portion that bends toward the first data transmitting line so that a first portion of the first shielding line has a first distance from the first data transmitting line and a second portion of the first shielding line has a second distance from the first data transmitting line less than the first distance,
the second shielding line includes a second bent portion that bends toward the second data transmitting line so that a first portion of the second shielding line has a third distance from the second data transmitting line and a second portion of the second shielding line has a fourth distance from the second data transmitting line less than the third distance, and
the first portion of the first shielding line having the first distance greater than the second distance and the first portion of the second shielding line having the third distance greater than the fourth distance are disposed closer to the data driving chip than the second portion of the first shielding line and the second portion of the second shielding line,
wherein the data driver further comprises a connecting portion that connects the first shielding line and the second shielding line to surround a first data pad and a second data pad connected to the first data transmitting line and the second data transmitting line, respectively.

15. The display apparatus of claim 14, wherein resistances of the first shielding line and the second shielding line are less than resistances of the first data transmitting line and the second data transmitting line.

16. The display apparatus of claim 14, wherein a distance between the first shielding line and the first data transmitting line is equal to or less than a distance between the first data transmitting line and the second data transmitting line, and
a distance between the second shielding line and the second data transmitting line is equal to or less than the distance between the first data transmitting line and the second data transmitting line.

\* \* \* \* \*